United States Patent [19]
Kokuga

[11] Patent Number: 5,642,032
[45] Date of Patent: Jun. 24, 1997

[54] CHARGING METHOD FOR A BATTERY ASSEMBLY INCLUDING A PLURALITY OF SECONDARY BATTERIES

[75] Inventor: Toshiharu Kokuga, Hyogo, Japan

[73] Assignee: Sanyo Electric Co., Ltd., Osaka, Japan

[21] Appl. No.: 519,209

[22] Filed: Aug. 25, 1995

[30] Foreign Application Priority Data

Aug. 30, 1994 [JP] Japan .................... 6-205313

[51] Int. Cl.$^6$ ...................... H02J 7/00
[52] U.S. Cl. .............. 320/22; 320/35; 324/426
[58] Field of Search .................. 320/21, 22, 35, 320/39; 324/426–450; 340/635–636

[56] References Cited

U.S. PATENT DOCUMENTS

| | | | |
|---|---|---|---|
| 4,639,655 | 1/1987 | Westhaver et al. | 320/14 |
| 4,709,202 | 11/1987 | Koenck et al. | 320/43 |
| 4,725,784 | 2/1988 | Peled et al. | 324/427 |
| 5,391,974 | 2/1995 | Shiojima et al. | 320/35 |

FOREIGN PATENT DOCUMENTS 424937 4/1992 Japan .

*Primary Examiner*—Peter S. Wong
*Assistant Examiner*—Gregory J. Teatley, Jr.
*Attorney, Agent, or Firm*—Loeb & Loeb LLP

[57] ABSTRACT

A charging apparatus charges a battery assembly including a plurality of secondary batteries. After the charging apparatus detects a full charge level, the apparatus stops charging. Then, when the charge level of the battery assembly falls below a predetermined charge level, the charging apparatus resumes charging in order to maintain the secondary battery assembly at a full charge level. The charging apparatus monitors the charging after charging is resumed. When the charging apparatus detects that the charging process after resumption of charging is abnormal, the apparatus modifies the charging. For example, when the battery assembly includes a malfunctioning secondary battery causing an abnormal charge resumption, the apparatus modifies the charging to prevent the other normal secondary batteries in the secondary battery assembly from being overcharged to avoid deterioration.

22 Claims, 6 Drawing Sheets

CHARGING METHOD FOR A BATTERY ASSEMBLY INCLUDING A PLURALITY OF SECONDARY BATTERIES

FIELD OF THE INVENTION

The present invention relates generally to the charging of secondary batteries, and more particularly, to the charging of secondary batteries to maintain the secondary batteries at a full charge level.

BACKGROUND OF THE INVENTION

Japanese Patent No. HEI 4-24937 describes a charging method in which an apparatus resumes charging in the event the terminal voltage of a lead acid secondary battery drops from a full charge level to a lower level as a result of self-discharge. In order to maintain the lead acid secondary battery at a full charge level, an apparatus in accordance with the method of this reference initially charges the secondary battery with a constant current, while monitoring the terminal voltage of the secondary battery. When the terminal voltage reaches a first predetermined voltage value corresponding to the full charge level charging is stopped. If the terminal voltage subsequently falls below a second predetermined voltage value, charging is resumed.

This method can maintain the secondary battery at or near the full charge level. However, when the apparatus charges a battery assembly which includes a plurality of secondary batteries and should one of the secondary batteries malfunction as a result of an inner short, for example, the remaining secondary batteries may become overcharged.

For example, a malfunctioning secondary battery can cause the terminal voltage of a battery assembly to drop immediately after being charged to a full charge level. Therefore, although the charge level of the other secondary batteries remain at or near a full charge level, the apparatus resumes charging, because the terminal voltage of the assembly falls below the second predetermined voltage value as a result of the malfunctioning secondary battery. By resuming charging, the other properly operating secondary batteries can become overcharged. Excessive overcharging can increase the internal gas pressure of the overcharged secondary batteries, causing a safety vent to open and thereby permit electrolyte inside the secondary batteries to leak through the open safety vent.

THE SUMMARY OF THE INVENTION

It is an object of the present invention to provide an improved method of charging a secondary battery assembly which avoids overcharging the normal secondary batteries if one of the batteries malfunctions.

These and other objects are achieved by a method of charging, in accordance with one embodiment of the present invention, which comprises the steps of: charging a secondary battery assembly including a plurality of secondary batteries; stopping charging when the secondary battery assembly is charged at a full charge level; resuming charging when the charge level of the secondary battery assembly falls below a predetermined charge level; monitoring the charging process after the resumption of charging; and modifying the charging if it is detected that the charging process after the resumption of charging is abnormal.

For example, in one embodiment, the charging apparatus detects an abnormal charge resumption process in the following manner. The apparatus stops charging when the battery assembly is charged to a full charge level. Upon resumption of charging, a timer measures the duration of time from the resumption of charging until charging is stopped again. When the measured time period is less than a predetermined time period, the apparatus identifies this charge resumption as an abnormal one. If so, the apparatus modifies the charging by, for example, stopping the charging until the battery assembly is taken off.

DETAILED DESCRIPTION OF THE PREFERRED EMBODIMENTS

First, second and third embodiments of a charging apparatus in accordance with the present invention are described with reference to FIGS. 3–6. This charging apparatus is suitable for charging a battery assembly which includes a plurality of secondary batteries. As explained in greater detail below, after the charging apparatus detects a full charge level, the apparatus stops charging. Then, should the charge level of the battery assembly fall below a predetermined charge level, the charging apparatus resumes charging in order to maintain the secondary battery assembly at the full charge level.

In accordance with one aspect of the present invention, the charging apparatus monitors the charging process after charging is resumed. Should the charging apparatus detect that the charging process after charging has resumed is not proceeding normally, the apparatus modifies the charging to prevent deterioration of the batteries. For example, if the battery assembly includes a malfunctioning secondary battery, the charging process after charging is resumed will not be normal. Therefore, upon detecting such an abnormal resumption of the charging process, the apparatus can control the charging to protect the normal secondary batteries of the secondary battery assembly from deterioration caused by overcharging.

Figure 1:
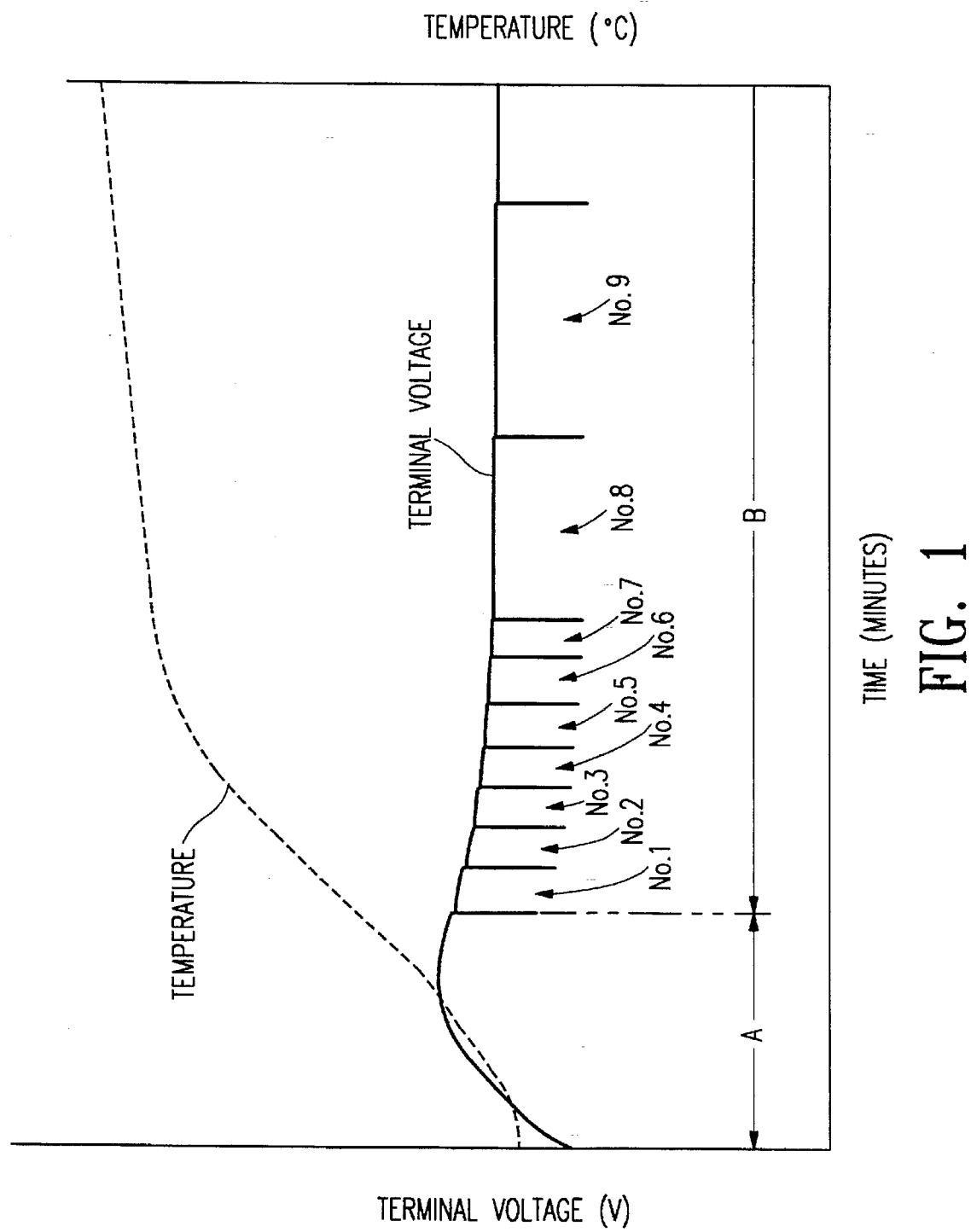
FIG. 1 is a graph showing charging characteristics as a function of time for the terminal voltage and temperature of a secondary battery assembly which includes a malfunctioning secondary battery.

FIG. 1 shows the charging characteristics of the terminal voltage and temperature of a secondary battery assembly being charged in which the assembly includes a malfunctioning battery. More specifically, the battery assembly of this example comprises five nickel-cadmium secondary batteries connected in series, one of which is malfunctioning as a result of an inner short. Consequently, the terminal voltage of this battery assembly is similar to that of a secondary battery assembly which comprises only four secondary batteries connected in series.

Figure 2:
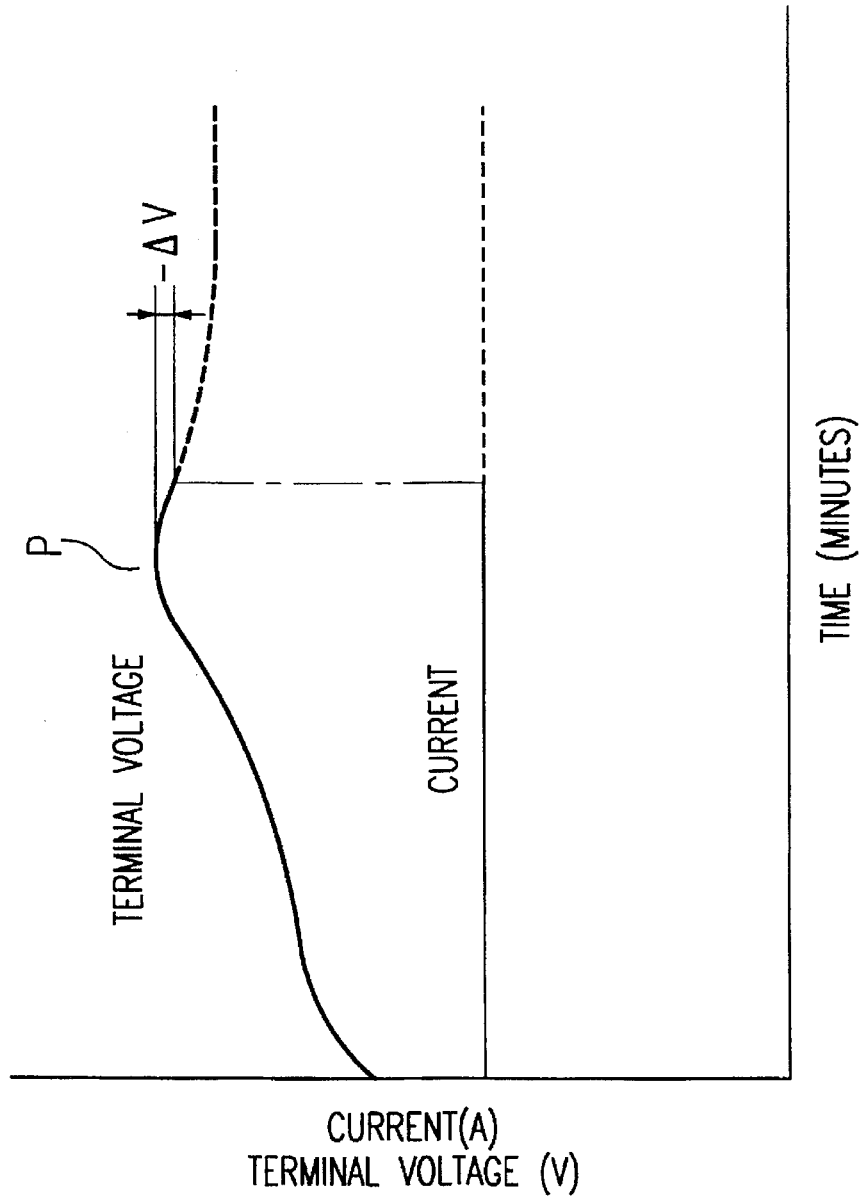
FIG. 2 is a graph showing charging characteristics of a conventional charging system.

FIG. 1 illustrates the charging characteristics of a malfunctioning battery assembly being charged by a conventional charging technique shown in FIG. 2. The charging technique of FIG. 2 is of a type often referred to as a −ΔV control system charge in which charging is stopped when it is detected that the terminal voltage of the nickel-cadmium battery has reached a peak (P) and thereafter has decreased by a predetermined voltage ΔV. In addition, dashed lines indicate the terminal voltage if the apparatus resumes charging after charging has been stopped. As shown in FIG. 2, if the apparatus continues charging after the terminal voltage has peaked and decreased by ΔV, the terminal voltage continues to gradually decrease.

In the charging process illustrated in FIG. 1, the charging apparatus charges a discharged secondary battery assembly with a constant charging current. During the initial charging interval A, the terminal voltage of the secondary battery assembly first rapidly increases, then more gradually increases, reaching the peak P, and then decreases. Once the terminal voltage has decreased by a predetermined voltage −ΔV, the charging apparatus detects this −ΔV charge as a full charge level, and stops charging. For example, the predetermined voltage −ΔV may be set to 10 mV/cell where a cell is a secondary battery.

A malfunctioning secondary battery cannot be properly charged. However, some voltage drop in the malfunctioning secondary battery is nonetheless caused by the constant charging current being applied across an internal resistance of the malfunctioning secondary battery. Therefore, when the charging apparatus charges a battery assembly which includes a malfunctioning secondary battery with a constant charging current, the terminal voltage of the battery assembly shows characteristics similar to that of a battery assembly which does not include a malfunctioning secondary battery because of the afore-mentioned voltage drop, as shown in FIG. 1.

Following the initial charging interval A, charging is temporarily stopped during an interval B to permit the charging apparatus to monitor the terminal voltage. As the secondary battery assembly includes a malfunctioning nickel-cadmium secondary battery, the terminal voltage will drop suddenly once charging is stopped. This sudden drop is indicated as "X" in FIG. 1. Because of this sudden drop, the terminal voltage falls below a predetermined voltage (e.g., 7.08 V) at which the apparatus will resume charging. Consequently, the apparatus resumes rapid charging which will cause the terminal voltage to rise again suddenly as also indicated as "X". Although the apparatus resumes charging, the other normal secondary batteries are still at a full charge level.

As explained above in connection with FIG. 2, when the secondary battery is continuously charged after the peak voltage value, the terminal voltage will gradually decrease. Accordingly, after the sudden rise following the resumption of charging, the terminal voltage will gradually decrease. Because the terminal voltage suddenly rises and then gradually decreases, the apparatus will detect a peak. Thereafter, the terminal voltage decreases until it decreases by the predetermined voltage −ΔV, at which time the apparatus stops charging. Thereafter, the apparatus immediately resumes charging as indicated at charge resumption No. 1 in FIG. 1. As shown by charge resumption Nos. 1–9 of FIG. 1, as long as the terminal voltage decreases by the predetermined voltage value ΔV, the apparatus repeatedly stops and then resumes charging. Therefore, because of the repeated resumption of charging, the other normal secondary batteries might be overcharged and deteriorate as a result.

During the charging resumption of interval B, the temperature of a secondary battery typically rises due to heat generated by the recombination of oxygen gas inside the secondary battery. Therefore, as shown by the dashed line in FIG. 1, the temperature of a secondary battery can rapidly increase, while the apparatus repeatedly resumes charging. In other words, the rate of change of temperature versus time is large.

In accordance with one embodiment of the present invention, after the detection of an abnormal charge resumption, the apparatus controls charging in accordance with the following methods.

1. The charging apparatus stops the resumption of charging until the battery assembly is taken off the charging apparatus, or the charging process is reset.

2. The charging apparatus stops the resumption of charging until a certain time length has elapsed, for example, a duration of time sufficient for the battery assembly to discharge to approximately a full discharge level. This method of the controlling charging can be applied to what is often referred to as a floating charge method. In the floating charge method, a battery assembly is connected by a circuit to a DC power source with a load in parallel. Normally, power from the DC power source is used to charge the battery assembly or to power the load. If the power consumption of the load increases beyond the supply capabilities of the DC power source, or if power from the DC power source shuts down, power will be discharged from the battery assembly.

In the application of the present invention to the floating charge method, the charging apparatus stops the resumption of charging until a time period has elapsed in which the battery assembly discharges to around a full discharge level. This time period may be calculated as follows. If a battery assembly has a capacity C mAh and the current to the load is C/10 mA, it generally requires 10 h for the battery assembly to discharge from the full charge level to the full discharge level. Therefore, after detecting an abnormal charging resumption, the charging apparatus stops the resumption of charging, and also stops the supply of power from the DC power source to the load. Then, the battery assembly is discharged to supply power to the load until the time period of 10 h has passed.

Figure 3:
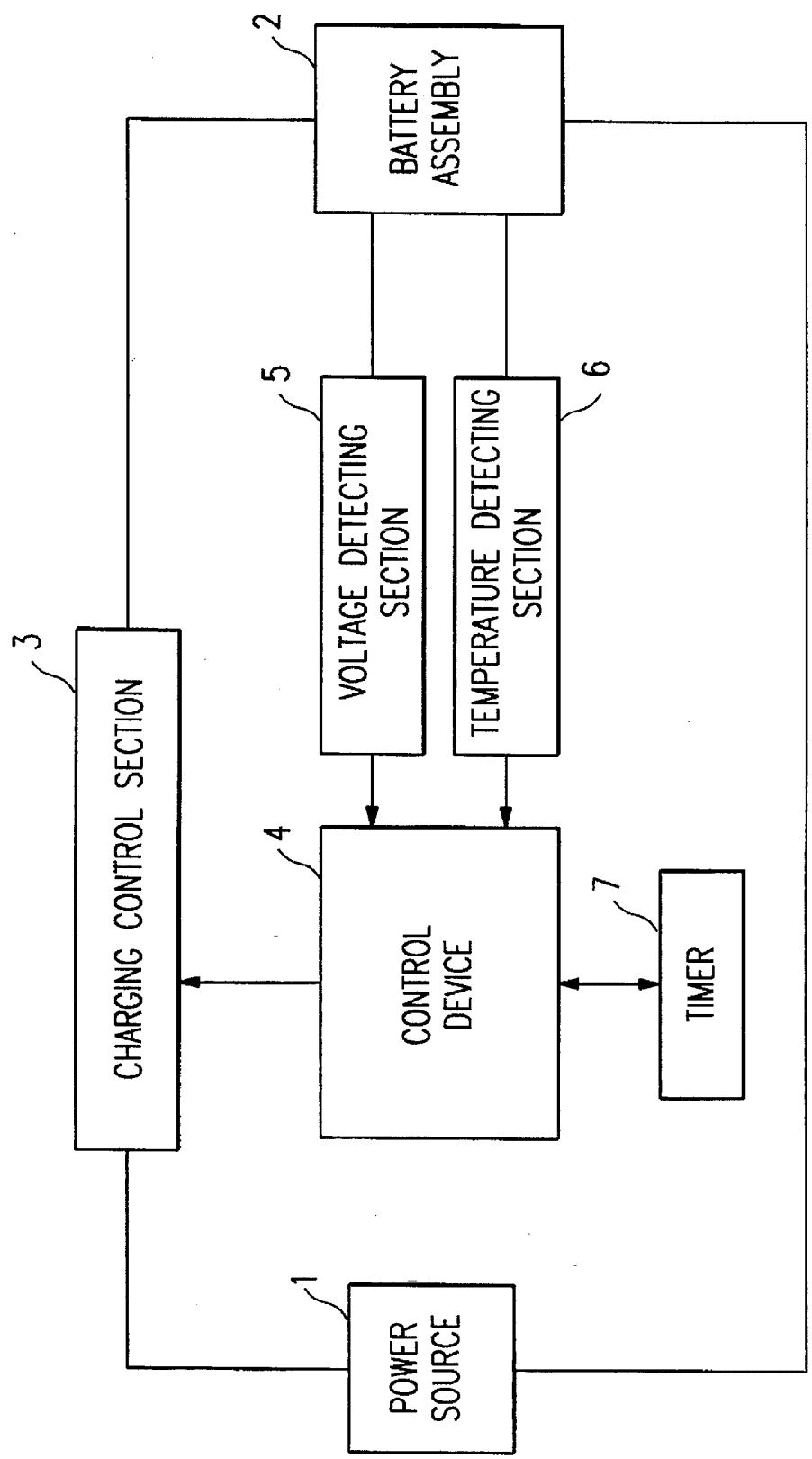
FIG. 3 is a block diagram of a charging apparatus in accordance with an embodiment of the present invention.

FIG. 3 shows a block diagram of a charging apparatus in accordance with a preferred embodiment. The apparatus comprises a power source 1 which converts line alternating current to a suitable direct current. A charging control section 3 is connected between the power source 1 and the battery assembly 2, and controls the charging state. A control device 4 controls the charging control section 3. A voltage detecting section 5 monitors the terminal voltage of the battery assembly 2 and also outputs data representative of the monitored terminal voltage to the control device 4. A temperature detecting section 6 monitors the temperature of the battery assembly 2 and also outputs data representing the monitored temperature to the control device 4. A timer 7 is connected to the control device 4. As described in greater detail below, the control device 4 controls the charging control section 3 in response to terminal voltage data from the voltage detecting section 5 and the temperature data from the temperature detecting section 6 to maintain the battery assembly 2 at or near a full charge level.

A charging method in accordance with a first embodiment will be described below with reference to a flow chart shown in FIG. 4. In the first embodiment, the charging apparatus detects an abnormal charge resumption process in the following manner. The apparatus stops charging when the battery assembly is charged to a full charge level. Upon resumption of charging, the timer 7 measures the duration of time from the resumption of charging until charging is stopped again. When the measured time period is less than a predetermined time period, the apparatus identifies this charge resumption as an abnormal one. If so, the apparatus modifies the charging by, for example, stopping the charging until the battery assembly is taken off.

Figure 4:
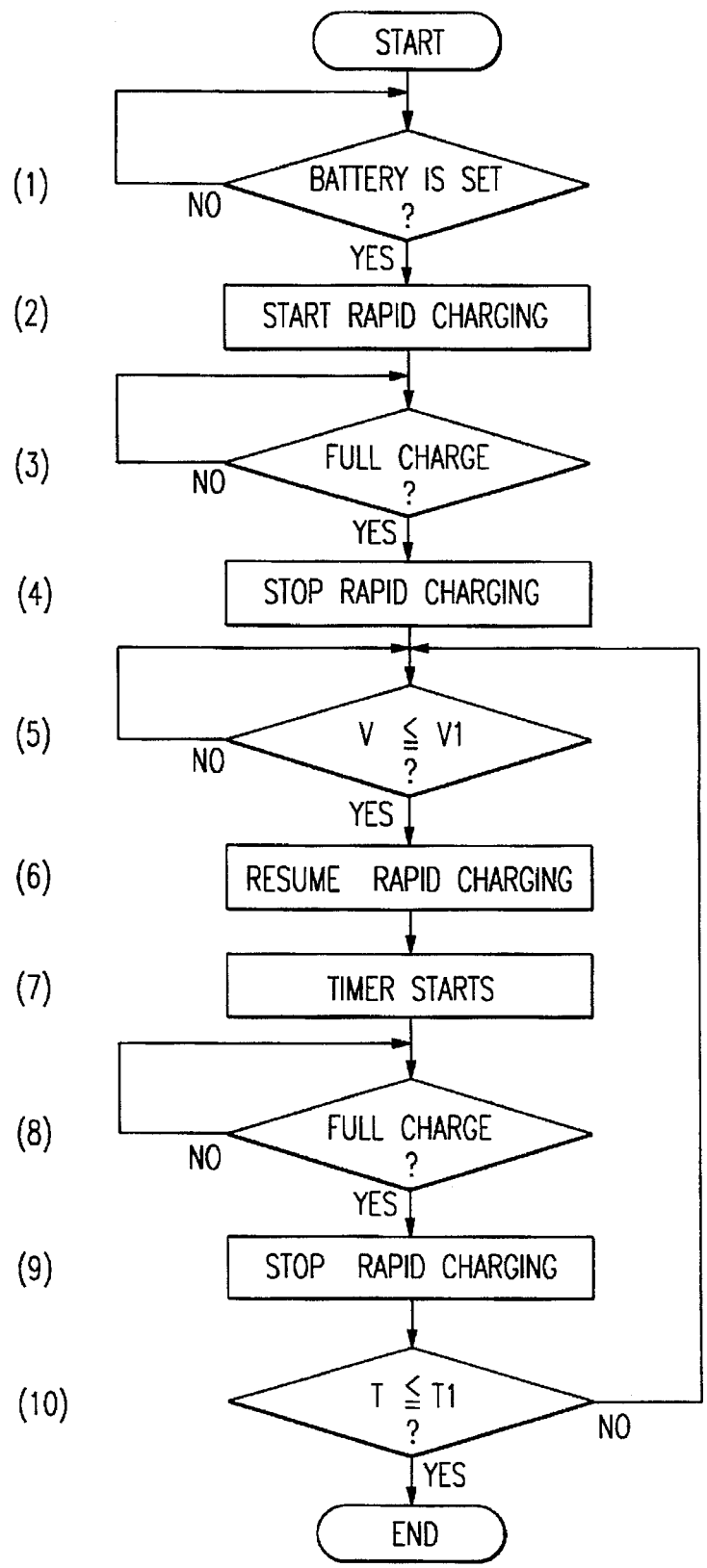
FIG. 4 is a flow chart showing a method of charging a secondary battery assembly in accordance with a first illustrated embodiment of the present invention.

As shown in the flow chart of FIG. 4, after the charging apparatus starts the process, the apparatus determines (step 1) whether the assembled battery is set. This may be detected by a microswitch which is disposed to be actuated when the assembly is set, or alternatively by monitoring the voltage between the terminals of the apparatus. If the battery assembly is set, the apparatus starts rapidly charging (step 2) the battery assembly with a constant current.

A determination is made (step 3) as to whether the assembled battery is charged to a full charge level. If the battery assembly is not charged to the full charge level, charging is continued until the battery assembly is charged to a full charge level. The full charge level is detected when the terminal voltage of the battery assembly has first reached a peak and thereafter has decreased by a predetermined voltage $\Delta V$.

When the secondary battery is determined to have been charged to the full charge level, the apparatus stops rapid charging (step 4). A determination is then made (step 5) as to whether the terminal voltage V of the battery assembly is equal to or less than a predetermined voltage (V1). If the terminal voltage is more than the predetermined voltage (V1), charging is not resumed and the voltage monitoring is continued.

Once the terminal voltage is found to be equal to or less than the predetermined voltage (V1), the apparatus resumes rapid charging (step 6) and the timer 7 starts timing (step 7). A determination is then made (step 8) as to whether the battery assembly is charged to a full charge level. If the battery assembly is not charged to the full charge level, charging continues until the battery assembly reaches a full charge level. The full charge level is detected in the same way as described above in connection with step 3.

When the secondary battery assembly is charged to the full charge level, the apparatus stops rapid charging (step 9). The timer 7 having measured the time period (T) from the resumption of charging in step 6 to cessation of charging in step 9, a determination is then made (step 10) as to whether the measured time period is equal to or less than a predetermined time length (T1).

The predetermined time length (T1) may be set to, for example, 10–20 minutes. The predetermined time period is set to a suitable value by taking into consideration the predetermined voltage (V1) at which the apparatus resumes charging. When the predetermined voltage (V1) is set to a high value, the amount of discharge from the full charge level to the voltage V1 is relatively small. Hence, the predetermined time period (T1) may be set to a relatively short time period, because it takes a relatively short time period to recharge the battery assembly to the full charge level. On the other hand, if the predetermined voltage (V1) is set to a relatively low value, the predetermined time length (T1) is preferably set to a relatively long period, since the amount of discharge to the low predetermined voltage (V1) is relatively large. If the measured time period (T) is determined (step 10) to be equal to or less than the predetermined time period (T1), the apparatus identifies this charge resumption as abnormal and the apparatus stops charging.

As explained above, an abnormal charge resumption can occur if the battery assembly includes at least one malfunctioning secondary battery. If the battery assembly includes a malfunctioning secondary battery, the apparatus can resume charging even though the other normal secondary batteries are charged at a full charged level. Such an abnormal resumption of charging can be detected if, for example, the time period from the resumption of charging to the next cessation of charging is short.

On the other hand, if the battery assembly comprises only normal secondary batteries, as the apparatus resumes charging the normal secondary batteries after the batteries have discharged to the predetermined voltage (V1), the time period from the resumption of charging to the cessation of charging is relatively long, i.e., more than the predetermined time length (T1) and further recharges are permitted. Accordingly, when the measured time period (T) is determined (step 10) to be more than the predetermined time length (T1), the process returns to step 5, and then repeats steps 5–10 to maintain the battery assembly at the full charge level.

A charging method in accordance with a second embodiment will be described below with reference to the flow chart shown in FIG. 5. In the second embodiment, the charging apparatus detects an abnormal charge resumption in the following manner. When the apparatus stops charging after a full charge level is reached, the apparatus samples the temperature of the battery assembly. The apparatus will resume charging after the charge level of the battery assembly falls below a predetermined level. When the apparatus subsequently stops charging, a second temperature of the battery assembly is sampled.

If the temperature difference between the sampled first temperature and the sampled second temperature is equal to or more than a predetermined temperature difference, the apparatus identifies the charge resumption process as an abnormal one. Then, the apparatus modifies the charging by, for example, stopping charging by until the battery assembly is removed.

Figure 5:
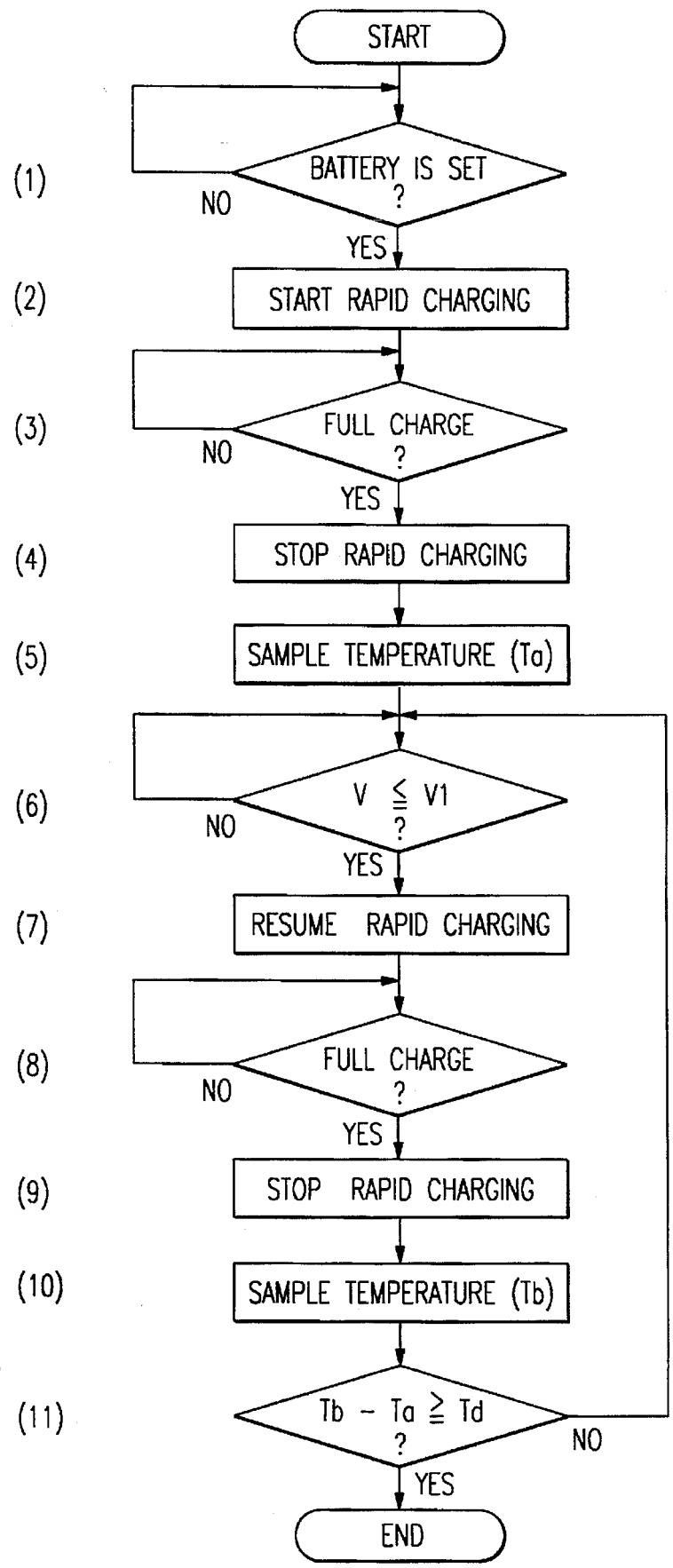
FIG. 5 is a flow chart showing a method of charging the secondary battery assembly in accordance with a second illustrated embodiment of the present invention.

As shown in the flow chart of FIG. 5, the process of the second embodiment progresses in the same way as the first embodiment until step 4. The remaining process is discussed below in detail.

The apparatus samples (step 5) a first temperature (Ta) of the battery assembly. A determination is made (step 6) as to whether the terminal voltage of the battery assembly is equal to or less than a predetermined voltage (V1). If the terminal voltage is more than the predetermined voltage (V1), charging is not resumed and the monitoring of the terminal voltage is continued. When the terminal voltage is equal to or less than the predetermined voltage (V1), the apparatus resumes rapid charging (step 7).

A determination is then made (step 8) as to whether the battery assembly is charged to a full charge level. If the battery assembly is not charged to the full charge level, charging continues until the battery assembly is charged to a full charge level. The full charge level is detected in the same way as step 3 discussed above.

When the secondary battery is determined to be charged to the full charge level, the apparatus stops rapid charging (step 9). Then, the apparatus samples (step 10) a second temperature (Tb) of the battery assembly. The apparatus compares (step 11) the temperature difference between the second temperature (Tb) and the first temperature (Ta) with a predetermined temperature difference (Td: e.g., 3° C.).

When the temperature difference is equal to or more than the predetermined temperature difference (Td), the apparatus identifies the charge resumption as an abnormal one and the apparatus stops charging. An abnormal charge resumption can result if the battery assembly includes at least one malfunctioning secondary battery. When the battery assembly includes a malfunctioning secondary battery, the apparatus resumes charging even though the other normal secondary batteries are charged at a full charged level. Consequently, the battery assembly can be overcharged, causing the temperature of the battery assembly to rise to a high level, as explained above in connection with FIG. 1.

On the other hand, when the battery assembly comprises normal secondary batteries, if the apparatus resumes charging the normal secondary batteries after they have discharged to the predetermined voltage (V1), the temperature does not rise to the high level. Therefore, if the temperature difference is less than the predetermined temperature difference (Td), the process returns to step 6, to repeat the steps 6–11 to maintain the battery assembly at a full charge level.

In an alternative embodiment, instead of sampling the first temperature (Ta) of the battery assembly in step 5, sampling the first temperature (Ta) can be immediately done after rapid charging is resumed in step 7. In this embodiment, the temperature difference between the sampled first temperature and the sampled second temperature is again compared with the predetermined temperature difference. It is believed that this modification to the method described above can diminish the influence of the ambient temperature.

In yet another alternative embodiment, the sampling of the first temperature in step 5 can be eliminated, and in place of step 11, the apparatus can compare the sampled second temperature (Tb) with a predetermined temperature (e.g., about 45° C.). This alternative method can simplify the abnormal charging detection process.

A charging method in accordance with a third illustrated embodiment will now be described below with reference to the flow chart shown in FIG. 6. In this illustrated embodiment, the charging apparatus detects an abnormal resumption of charging in the following manner. The apparatus samples the time rate of change of the temperature of the battery assembly, while charging. When the time rate of change is equal to or more than a predetermined value, the apparatus identifies this charge resumption as an abnormal one. Then, the apparatus modifies the charging by, for example, stopping the charging until the battery assembly is removed from the battery charging apparatus.

Figure 6:
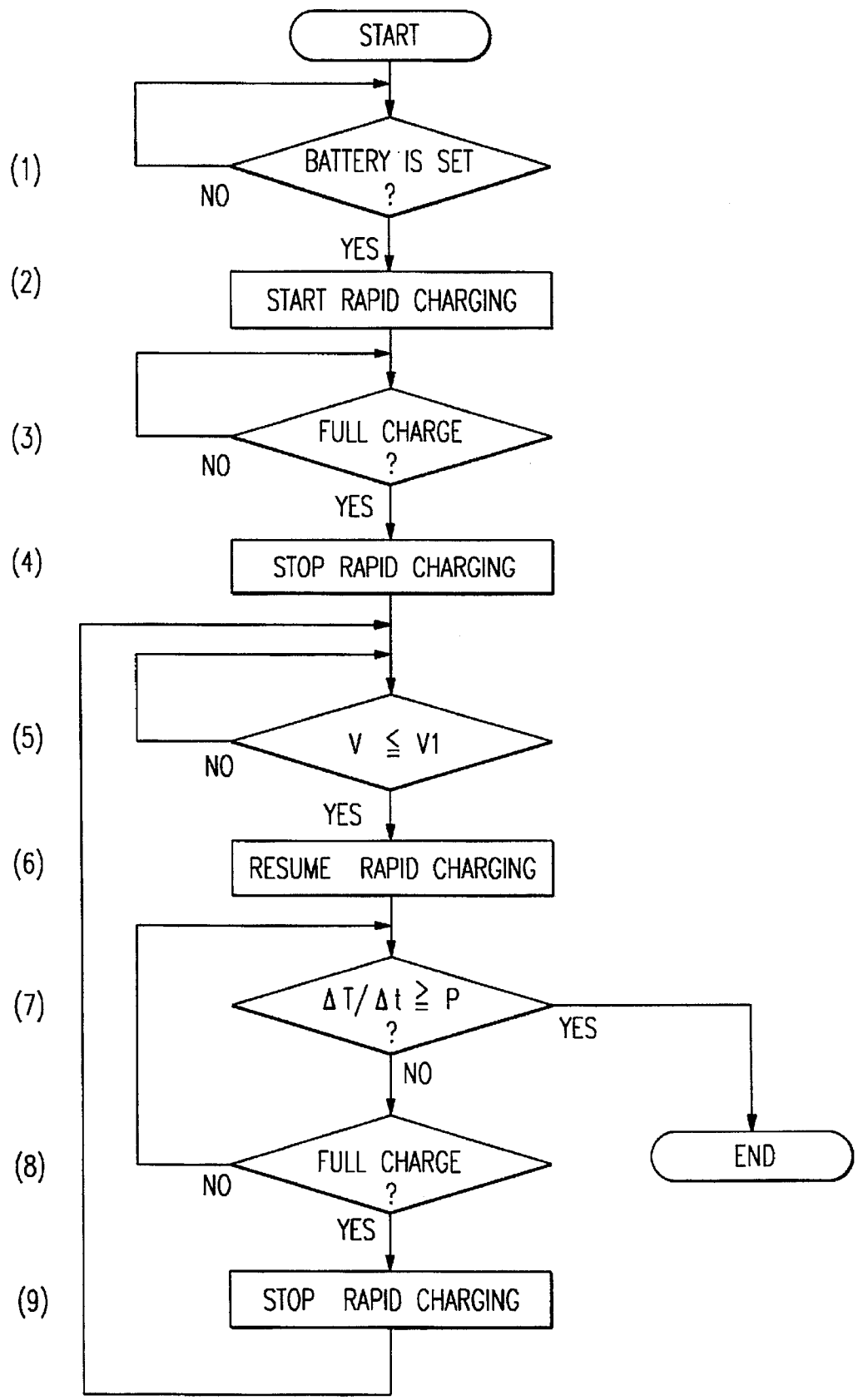
FIG. 6 is a flow chart showing a method of charging the secondary battery assembly in accordance with a third illustrated embodiment of the present invention.

As shown in the flow chart of FIG. 6, the process of the third embodiment progresses in the same way as the first embodiment until step 6. The succeeding process steps are discussed below in detail.

The apparatus samples (step 7) the time rate of change of temperature at which the temperature of the battery assembly rises. A determination is made as to whether the sampled rate is equal to or more than a predetermined value (P:e.g., 0.4° C./min). If the time rate of temperature change exceeds the predetermined value (P), the apparatus identifies this charge resumption as an abnormal one and the apparatus stops charging.

When charging of a battery assembly which includes one malfunctioning secondary battery is resumed even though the other normal secondary batteries remain charged at a full charged level, the battery assembly can become overcharged and the temperature of the battery assembly can rise rapidly, as explained and shown in FIG. 1. On the other hand, when the battery assembly comprises only normal secondary batteries, the resumption of charging of normal secondary batteries which have discharged to the predetermined voltage (V1) will not cause the temperature to rise rapidly.

When the time rate of change is less than the predetermined value (P), the apparatus identifies this charge resumption as a normal one. Consequently, a determination is made (step 8) as to whether the battery assembly is charged at a full charge level. If the battery assembly is not charged at the full charge level, the process goes back to step 7 and charging is continued until a full charge level is detected (step 8).

When the secondary battery is charged to the full charge level, the apparatus stops rapid charging (step 9). Then, the process returns to step 5, and repeats steps 5–9 to maintain the battery assembly at the full charge level.

It will, of course, be understood that modifications of the present invention, in its various aspects will be apparent to those skilled in the art, some being apparent only after study and others being matters of routine electrical design. As such, the scope of the invention should not be limited by the particular embodiments herein described but should be defined only by the appended claims and equivalents thereof.

What is claimed:

1. A method of charging a battery assembly including a plurality of secondary batteries, comprising:
   charging the battery assembly;
   stopping charging, when the battery assembly is charged to a full charge level;
   resuming charging, when the charge level of the battery assembly falls below a predetermined charge level substantially above a full discharge level;
   monitoring the charging after the resumption of charging to determine if the resumption of charging is abnormal; and
   modifying the charging if the resumption of charging is determined to be abnormal.

2. A method of charging a battery assembly including a plurality of secondary batteries, comprising:
   charging the battery assembly;
   stopping charging, when the battery assembly is charged to a full charge level;
   resuming charging, when the charge level of the battery assembly falls below a predetermined charge level;
   monitoring the charging after the resumption of charging to determine if the resumption of charging is abnormal, wherein monitoring the charging after the resumption of charging comprises:
      stopping charging when the battery assembly is charged to the full charge level after charging is resumed; and
      measuring the time period from the resumption of charging until the charging is stopped; and
   modifying the charging if the resumption of charging is determined to be abnormal.

3. A method according to claim 1, wherein the charge level of the battery assembly is monitored through a terminal voltage of the battery assembly.

4. A method according to claim 2, wherein it is determined that the charging after the resumption of charging is abnormal, when the measured time period is less than a predetermined time period.

5. A method of charging a battery assembly including a plurality of secondary batteries, comprising:
   charging the battery assembly;
   stopping charging, when the battery assembly is charged to a full charge level;
   resuming charging, when the charge level of the battery assembly falls below a predetermined charge level;

monitoring the charging after the resumption of charging to determine if the resumption of charging is abnormal, wherein monitoring the charging after the resumption of charging comprises:
stopping charging;
sampling a first temperature of the battery assembly;
resuming charging;
stopping charging when the battery assembly is charged to the full charge level; and
sampling a second temperature; and modifying the charging if the resumption of charging is determined to be abnormal.

6. A method according to claim 5, wherein it is determined that the charging after the resumption of charging is abnormal, when the temperature difference between the sampled first temperature and the sampled second temperature is more than a predetermined temperature difference.

7. A method according to claim 1, wherein the step of monitoring the charging after the resumption of charging comprises:
stopping charging when the battery assembly is charged to a full charge level after charging is resumed; and
sampling the temperature of the battery assembly.

8. A method according to claim 7, wherein it is determined that the charging after the resumption of charging is abnormal, when the sampled temperature exceeds a predetermined temperature.

9. A method according to claim 1, wherein the step of monitoring the charging after the resumption of charging comprises:
sampling a time rate of change of temperature of the battery assembly.

10. A method according to claim 9, wherein it is determined that the charging after the resumption of charging is abnormal when the sampled time rate of change of temperature exceeds a predetermined value.

11. A method as in claims 1, wherein the full charge level is detected, when a terminal voltage of the assembled battery has reached a peak and thereafter has decreased by a predetermined voltage $\Delta V$.

12. A method as in claims 2, wherein the full charge level is detected, when a terminal voltage of the assembled battery has reached a peak and thereafter has decreased by a predetermined voltage $\Delta V$.

13. A method as in claims 5, wherein the full charge level is detected, when a terminal voltage of the assembled battery has reached a peak and thereafter has decreased by a predetermined voltage $\Delta V$.

14. A method as in claims 7, wherein the full charge level is detected, when a terminal voltage of the assembled battery has reached a peak and thereafter has decreased by a predetermined voltage $\Delta V$.

15. A method according to claim 1, wherein the step of modifying charging comprises stopping charging.

16. A method according to claim 1, wherein the step of modifying charging comprises discharging the battery assembly to a full discharge level.

17. An apparatus for charging a battery assembly including a plurality of secondary batteries, comprising:
charging means for charging the battery assembly;
stopping means for stopping charging, when the battery assembly is charged to a full charge level;
resuming means for resuming charging, when the charge level of the battery assembly falls below a predetermined charge level substantially above a full discharge level;
monitoring means for monitoring the charging after the resumption of charging to determine if the resumption of charging is abnormal; and
modifying means for modifying the charging if the resumption of charging is determined to be abnormal.

18. A method of charging a battery assembly including a plurality of secondary batteries, comprising:
charging the battery assembly;
stopping charging when a terminal voltage of the battery assembly has reached first peak and thereafter has decreased by a predetermined voltage $\Delta V$;
resuming charging when the terminal voltage of the battery assembly falls below a predetermined voltage value;
stopping charging when the terminal voltage of the battery assembly has reached second peak and thereafter has decreased by the predetermined voltage $\Delta V$ after charging is resumed;
measuring a time period from the resumption of charging until the charging is stopped; and
stopping the charging if the measured time period is less than a predetermined time period.

19. An apparatus for charging a battery assembly including a plurality of secondary batteries, comprising:
a charging circuit that charges the battery assembly;
a stopping circuit that stops charging, when the battery assembly is charged to a full charge level;
a resuming circuit that resumes charging, when the charge level of the battery assembly falls below a predetermined charge level substantially above a full discharge level;
a monitoring circuit that monitors the charging after the resumption of charging to determine if the resumption of charging is abnormal;
a modifying circuit that modifies the charging if the resumption of charging is determined to be abnormal.

20. A method of charging a battery assembly including a plurality of secondary batteries, comprising:
charging the battery assembly;
stopping charging, when the battery assembly is charged to a full charge level;
resuming charging, when the charge level of the battery assembly falls below a predetermined charge level after the stopping charging;
monitoring the charging after the resumption of charging to determine if the resumption of charging is abnormal; and
modifying the charging if the resumption of charging is determined to be abnormal,
wherein the resuming charging is done each time the charge level of the battery assembly falls below the predetermined charge level, so that the battery assembly is maintained at the full charge level.

21. An apparatus for charging a battery assembly including a plurality of secondary batteries, comprising:
charging means for charging the battery assembly;
stopping means for stopping charging when a terminal voltage of the battery assembly has reached first peak and thereafter has decreased by a predetermined voltage $\Delta V$;
resuming means for resuming charging when the terminal voltage of the battery assembly falls below a predetermined voltage value;

stopping means for stopping charging when the terminal voltage of the battery assembly has reached second peak and thereafter has decreased by the predetermined voltage ΔV after charging is resumed;

measuring means for measuring a time period from the resumption of charging until the charging is stopped; and stopping means for stopping the charging if the measured time period is less than a predetermined time period.

22. An apparatus for charging a battery assembly including a plurality of secondary batteries, comprising:

a charging circuit that charges the battery assembly;

a stopping circuit that stops charging when a terminal voltage of the battery assembly has reached first peak and thereafter has decreased by a predetermined voltage ΔV;

a resuming circuit that resumes charging when the terminal voltage of the battery assembly falls below a predetermined voltage value;

a stopping circuit that stops charging when the terminal voltage of the battery assembly has reached second peak and thereafter has decreased by the predetermined voltage ΔV after charging is resumed;

a measuring circuit that measures a time period from the resumption of charging until the charging is stopped; and a stopping circuit that stops the charging if the measured time period is less than a predetermined time period.

* * * * *